Patented Aug. 26, 1924.

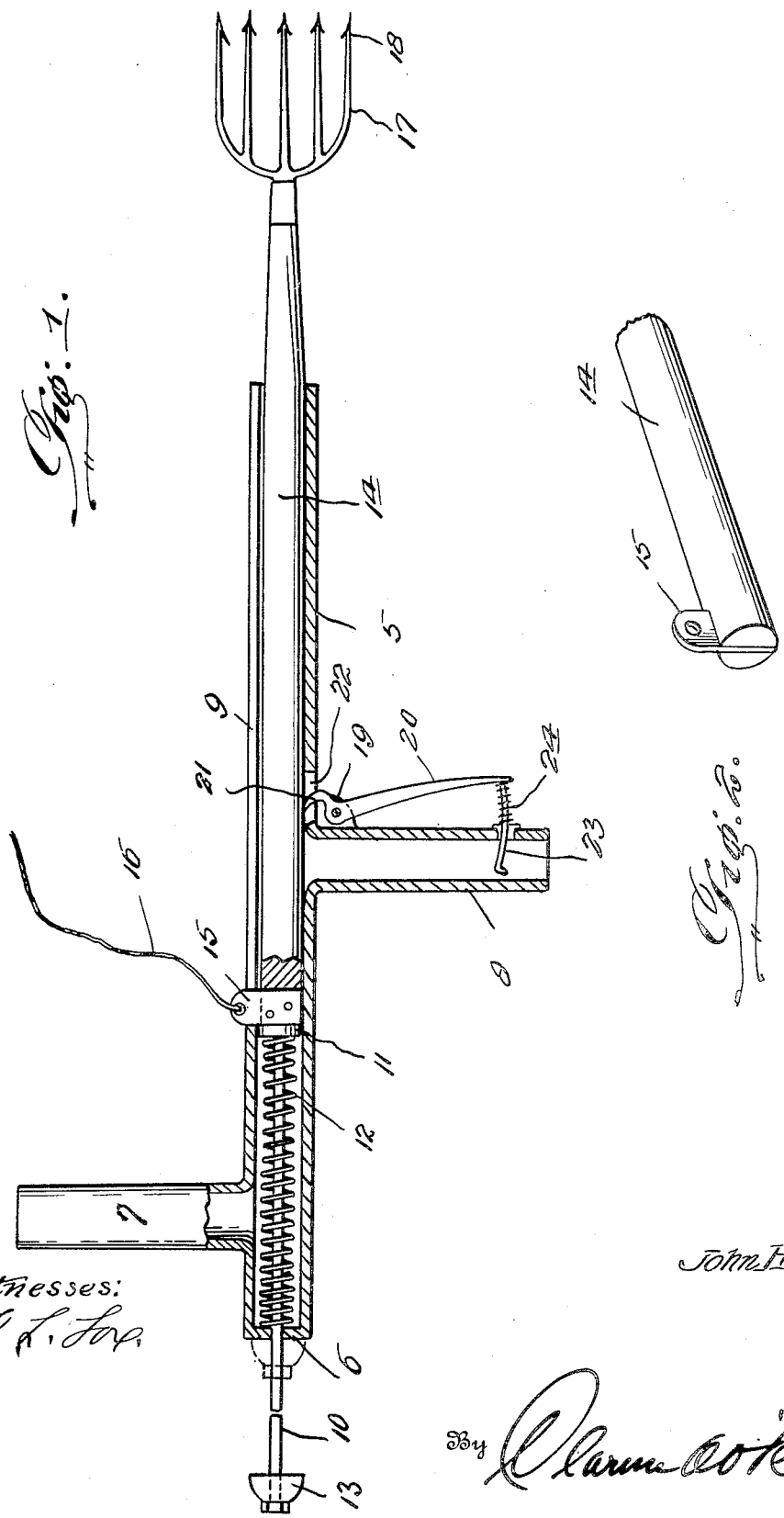

1,506,068

UNITED STATES PATENT OFFICE.

JOHN H. LANGE, OF ALPENA, MICHIGAN.

FISH-SPEARING DEVICE.

Application filed October 3, 1923. Serial No. 666,325.

*To all whom it may concern:*

Be it known that I, JOHN H. LANGE, citizen of the United States, residing at Alpena, in the county of Alpena and State of Michigan, have invented certain new and useful Improvements in Fish-Spearing Devices, of which the following is a specification.

This invention relates to certain new and useful improvements in fish spearing devices, and has particular reference to means for effectively spearing the larger kinds of fish, as distinguished from those caught by hook and line.

The primary object of the invention is to provide a fish spearing device which embraces the desired qualities of simplicity and durability of construction, as well as efficiency in operation.

Another object of the invention is to provide mechanical means for projecting a spear toward a fish to be caught, and embodying means for effectively and conveniently controlling the movement at which the spear is projected.

Another object of the invention is to provide means for preventing turning of the spear about its longitudinal axis so that a correct spearing of the fish may be had.

Other objects will appear as the nature of the invention is better understood, and the same consists in the novel form, combination, and arrangement of parts, hereinafter more fully described, shown in the accompanying drawing, and claimed.

In the drawing, wherein like reference characters indicate corresponding parts in the two views:

Figure 1 is a view, partly in central longitudinal section, and partly in elevation of a fish spearing device constructed in accordance with the present invention, and Figure 2 is a perspective view of the inner end portion of the spear.

Referring more in detail to the drawing, the spearing device embodies a projecting apparatus or gun composed of a barrel or tube 5, that is open at its outer end and closed at its inner end by means of a wall 6, a pair of laterally projecting handles 7 and 8 being provided upon the barrel 5 respectively at the inner end portion of the latter and any point substantially midway between its ends, The barrel or tube 5 is provided with a relatively long longitudinal slot 9 that extends inwardly from the outer end thereof for a purpose which will presently become apparent. Slidably disposed through the end wall 6 of the barrel is a rod or stem 10 upon the inner end of which is a head or plunger 11 against the inner side of which is engaged the other end of a coiled or helical compression spring 12. The spring 12 encircles the rod 10 within the inner end of the tube or barrel 5 and has its upper end engaging the inner face of the wall 6, so that said spring normally tends to urge the plunger forwardly toward the open end of the valve 5. A cushion block 13 is suitably secured upon the end of the rod 10 exteriorly of and rearwardly of the wall 6, in position to engage the last named wall when the plunger 11 is projected under the influence of the spring 12 so that the device will not be subjected to jars and will not make an objectionable noise.

The spear employed with the gun includes a shank 14 upon the inner end of which is a laterally extending lug or ear 15 that is provided with an aperture to which one end of a line 16 may be attached, said lug 15 projecting into the slot 9 so as to guide the spear when projected and preventing its turning about the longitudinal axis of the shank 14. This lug may consist in the projecting end of a plate fixed in a slot in the inner end of the shank 14 and it is to be understood that the outer end of the line 16 may be held in the hand of an operator or tied to a suitable support whereby the line may be utilized in receiving the spear after the same is projected.

The outer end of the shank 14 is provided with a plurality of prongs 17 that have their free ends formed after the fashion of the ends of fish hooks so that the fish may not readily disengage himself from the prong as indicated at 18.

The barrel 5 is provided with an ear 19 adjacent the inner end of the handle 8 to which is pivoted a catch 20 that extends substantially parallel with the handle 8 and has a pointed hook shaped inner end as at 21 normally disposed into a slot 22 provided in the adjacent portion of the barrel 5, in position to penetrate the adjacent portion of the spear shank 14 for holding the latter within the barrel 5. The means for normally engaging the catch 20 with the shank 14 may consist of a rod 23 slidable through the handle 8 and normally projects into engagement with the adjacent end of the catch by means of a spring 24 encircling the same, between the handle 8 and said adjacent end of the catch.

In operation, the spear is forced into the tube or barrel 5 so as to cause the plunger 11 to be forced inwardly for compressing the spring 12 and as soon as the spear has been properly positioned, it will be engaged by the pointed hooked end 21 of the catch 20 for holding the same against outward displacement. The handles 7 and 8 are then grasped by the hands of the user so as to point the spear at the fish to be caught, one hand of the operator being loosely disposed about the outwardly projecting end of the catch 20. When a proper aim has been secured, the catch 20 is pressed at its outer end portion toward the handle 8, so as to release the same from the shank 14 of the spear, whereupon, the spring 12 urges the plunger 11 forwardly, so as to project the spear toward the fish. When the fish has been properly speared, he may be landed or brought within reach of the user of the device by pulling in upon the line 16.

From the foregoing description, it is believed that the construction and operation as well as the advantages of the present invention will be readily understood and appreciated by those skilled in the art.

Minor changes may be made without departing from the spirit and scope of the invention as claimed.

What I claim as new is:

1. In a fish spearing device of the character described, a barrel open at one end and closed at the other, a pair of rigid handles respectively projecting laterally from the barrel at the inner end portion of the latter and substantially at a point intermediate the ends of the same, a spear having a shank positionable within said barrel, means for automatically latching the shank within the barrel against outward projection and carried adjacent the second named handle, and spring means upon the inner end of the barrel for projecting the spear therefrom.

2. In a fish spearing device of the character described, a barrel open at one end and closed at the other, a pair of rigid handles respectively projecting laterally from the barrel at the inner end portion of the latter and substantially at a point intermediate the ends of the same, a spear having a shank positionable within said barrel, means for automatically latching the shank within the barrel against outward projection and carried adjacent the second named handle, spring means upon the inner end of the barrel for projecting the spear therefrom, said barrel being provided with a longitudinal slot extending inwardly from the outer end thereof, and the shank of said spear being provided with a laterally extending ear projecting into said slot for guiding the spear in its projecting movement, and for facilitating attachment of a line to the spear.

3. In a fish spearing device, a barrel having a pair of oppositely extending laterally directed handles at staggered points thereon, a rod slidable through the inner end of the barrel and having a plunger upon the forward end thereof within the barrel, a cushion block mounted upon the rod outwardly of the barrel, a spring surrounding the rod between the inner end of the barrel and said plunger for projecting the latter toward the open end of the barrel, and means to automatically receive a spear shank within said barrel, said last named means being manually releasable by a grasping operation of one of the handles.

In testimony whereof I affix my signature.

JOHN H. LANGE.